US012006756B2

(12) United States Patent
Decore et al.

(10) Patent No.: US 12,006,756 B2
(45) Date of Patent: Jun. 11, 2024

(54) ACCESSORY WITH A TILTABLE ACCESSORY SUPPORT AND A LOCKING SYSTEM RELEASABLE BY MEANS OF A TILTABLE ACTUATOR BUTTON

(71) Applicants: LEGRAND FRANCE, Limoges (FR); LEGRAND SNC, Limoges (FR)

(72) Inventors: Raphaël Decore, Sillé-le-Guillaume (FR); François Perrignon de Troyes, Le Mans (FR)

(73) Assignees: LEGRAND FRANCE, Limoges (FR); LEGRAND SNC, Limoges (FR)

( * ) Notice: Subject to any disclaimer, the term of this patent is extended or adjusted under 35 U.S.C. 154(b) by 791 days.

(21) Appl. No.: 17/103,525

(22) Filed: Nov. 24, 2020

(65) Prior Publication Data
US 2021/0156185 A1 May 27, 2021

(30) Foreign Application Priority Data
Nov. 26, 2019 (FR) ...................................... 1913238

(51) Int. Cl.
*E05F 3/18* (2006.01)
(52) U.S. Cl.
CPC ........ *E05F 3/18* (2013.01); *A47B 2200/0088* (2013.01)
(58) Field of Classification Search
CPC ............... E05F 3/18; A47B 2200/0088; A47B 2021/068; H02G 3/14; H02G 3/185; H01R 13/502; H01R 13/514; H01R 13/74
See application file for complete search history.

(56) References Cited

U.S. PATENT DOCUMENTS 5,008,491 A * 4/1991 Bowman ................ H02G 3/185
174/489
5,755,582 A 5/1998 Charlton
(Continued)

FOREIGN PATENT DOCUMENTS

CN          106602340       4/2017
CN          106785639       5/2017
(Continued)

OTHER PUBLICATIONS

French Search Report for FR 1913238 dated Jun. 19, 2020, 2 pages.

*Primary Examiner* — Michael C Zarroli
(74) *Attorney, Agent, or Firm* — NIXON & VANDERHYE

(57) ABSTRACT

An accessory includes: a façade plate presenting an opening; an accessory support mounted to tilt through the opening between a lowered position in which it extends below the façade plate, and a raised position in which a major portion thereof extends above the façade plate; and a locking system including a locking arm movable between a locking position in which a blocking portion of the locking arm bears against a blocking surface of the accessory support, and a release position in which the blocking portion is spaced apart from the blocking surface, and an actuator button, causing each locking arm to move, which actuator button is tiltable about a tilt axis extending parallel to the mean plane of the façade plate. Each locking arm pivots about a pivot axis perpendicular to the actuator button tilt axis, and a return mechanism continuously urges each locking arm into its locking position.

20 Claims, 10 Drawing Sheets

(56) References Cited

U.S. PATENT DOCUMENTS

| | | | | |
|---|---|---|---|---|
| 2004/0147147 | A1* | 7/2004 | Griepentrog | H01R 13/447 |
| | | | | 439/131 |
| 2010/0178797 | A1* | 7/2010 | Byrne | H01R 25/006 |
| | | | | 439/540.1 |
| 2017/0077691 | A1 | 3/2017 | Zheng et al. | |
| 2018/0034220 | A1* | 2/2018 | Forti | H01R 24/76 |

FOREIGN PATENT DOCUMENTS

| | | |
|---|---|---|
| CN | 206412522 | 8/2017 |
| CN | 206412531 | 8/2017 |
| CN | 206516829 | 9/2017 |
| EP | 2 458 700 | 5/2012 |
| FR | 3 074 368 | 5/2019 |

* cited by examiner

ACCESSORY WITH A TILTABLE ACCESSORY SUPPORT AND A LOCKING SYSTEM RELEASABLE BY MEANS OF A TILTABLE ACTUATOR BUTTON

CROSS-REFERENCE TO RELATED APPLICATIONS

This application claims priority to fr 1913238 filed Nov. 26, 2019, the entire contents of each of which is hereby incorporated by reference.

BACKGROUND OF THE INVENTION

Field of the Invention

In general, the present invention relates to accessories for flush mounting in a wall, having a mechanism that is mounted on a tiltable support so as to disappear below the wall or be accessible by projecting from such a wall.

The invention finds a particularly advantageous application in providing a power outlet or a USB socket for a floor, for a desk, or for the wall of a building.

The invention relates more particularly to an accessory that comprises:
- a façade plate presenting an opening;
- an accessory support that is mounted to tilt through said opening between a lowered position in which it extends below the façade plate, and a raised position in which a major portion thereof extends above the façade plate; and
- a locking system that comprises firstly at least one locking arm that is movable between a locking position in which a blocking portion of said locking arm bears against a blocking surface of the accessory support, and a release position in which said blocking portion is spaced apart from said blocking surface, and secondly an actuator button, distinct from the accessory support, that co-operates with said locking arm so as to cause each locking arm to move, which actuator button is tiltable about a tilt axis that extends parallel to the mean plane of said façade plate.

DESCRIPTION OF THE RELATED ART

Documents CN206516829, CN206412531, CN206412522, CN106785639, and CN106602340 already disclose accessories in which each locking arm forms part of a fork that moves in translation between the locking and release positions. The fork is urged continuously towards its release position by compression springs. In this example, the actuator button in its closed position on the façade plate pushes the fork into its locking position against the action of the compression springs. It is then necessary to provide an additional compression spring that acts on the actuator button so that, in the closed position, said actuator button is capable of pushing hard enough against said fork so as to hold it in its locking position, while allowing the actuator button to open towards its tilted open position, merely under the pressure of a user's finger on the front face of the button, so as to release the fork, which then takes up its release position under the action of its compression springs.

Adjusting the stiffness of the compression spring acting on the actuator button is not easy to do, and the presence of this compression spring, acting in localized manner on said actuator button, requires the user to exert the opening pressure at a precise location on the front face of the actuator button, situated in register with the compression spring positioned below the button.

Also, FR 3 074 368 discloses an electrical accessory comprising an accessory support that is tiltable between a retracted position and a deployed position through an opening of a mounting frame, and a jack that continuously thrusts the accessory support towards its deployed position. In that document, a locking system is provided for locking the accessory support in its retracted position, which locking system comprises a channel section member that is secured to the bottom of the accessory support and that co-operates with the end of a locking arm. In that document, the locking arm is adapted to tilt about an axis that is parallel to the tilt axis of the accessory support, under the action of any resilient return means that urge the locking arm into its release position. In its locking position, the end of the locking arm is engaged in the channel section member that is secured to the accessory support. The locking arm thus holds the accessory support in its retracted position against the thrust of the jack and of the resilient return means acting on the locking arm itself. By pressing on the accessory support, it is driven into the opening of the frame, thereby causing the end of the locking arm to disengage from the channel section member. In this way, the locking support is released from co-operating with the locking arm, which support can then tilt towards its deployed position under the thrust of the jack. The locking arm also tilts towards its release position under the action of the resilient return means.

In that document FR 3 074 368, there is not provided an actuator button independent of the accessory support, but the front face of said accessory support includes a marked zone for the user to press a finger on the accessory support itself. And, in that document, it is the accessory support that co-operates directly with the locking arm.

The accessory in document FR 3 074 368 is complicated with numerous parts interacting with one another and requiring continuous adjustments.

SUMMARY OF THE INVENTION

Compared to the above-mentioned prior art, the invention proposes an accessory that is simpler to manufacture and to use, in which the actuation of the actuator button is easy and intuitive.

More particularly, the invention proposes an accessory as defined in the introduction in which each locking arm is pivotable about a pivot axis that is perpendicular to said tilt axis of the actuator button, and in which resilient return means are provided that continuously urge each locking arm into its locking position.

The accessory of the invention has other characteristics that, taken individually or in any technically possible combination, are non-limiting and advantageous, and that are as follows:
   the façade plate comprises a frame that is defined between an outer peripheral edge and an inner peripheral edge, the inner peripheral edge defining said opening, said actuator button includes a presser wall that is positioned above a branch of the frame defined between a portion of said inner and outer peripheral edges, the presser wall presenting a front face that forms a presser surface to be pressed by a user's finger, and said actuator button being adapted to tilt between a standby position, in which said front face of said presser wall extends substantially parallel to the mean plane of the façade plate, and an actuated position, tilted towards the outside of the façade plate, in which said presser wall moves closer to the outer peripheral edge of said façade plate, with its front face sloping relative to the mean plane of the façade plate;

the actuator button includes an actuator rib of height that extends rearwards from the rear face of the presser wall, substantially perpendicularly to said presser wall, the actuator rib being continuously in contact with said locking arm;

said locking arm extends lengthwise between one end portion that forms said blocking portion, and an opposite other end portion that forms an actuator portion that is continuously in contact with said actuator rib of the actuator button, the pivot axis of said locking arm being situated in the proximity of the actuator portion;

two locking arms are provided, positioned so that their actuator portions are close to each other, continuously in contact with the actuator rib of the actuator button, and so that their pivot axes intersect the mean plane of the façade plate at positions lying on a line that is parallel to the portions of the inner and outer peripheral edges of the façade plate that form the longitudinal edges of said branch of the façade plate;

said resilient return means are compressed between each locking arm and said actuator rib, such that they likewise act continuously on said actuator button so as to return it towards its standby position;

said resilient return means are compressed between each locking arm and a portion of the façade plate;

the presser wall of the actuator button presents an outline that is rectangular, and lengthwise the actuator rib extends parallel to the longitudinal edges of said presser wall;

lengthwise the presser wall of the actuator button is oriented parallel to the portions of the inner and outer peripheral edges of the façade plate that form the longitudinal edges of said branch of the façade plate;

said presser wall presents a large surface area and a length that is a little greater than the length of said branch of the façade plate so that it covers a major portion of the front face of said branch of said façade plate together with a portion of said outer peripheral edge of the façade plate, which portion of the outer peripheral edge forms firstly the entire outer longitudinal edge of said branch, and secondly a portion of the transverse edges of said branch;

the presser wall of the actuator button presents an outline that is rectangular, and lengthwise the actuator rib extends perpendicularly to the longitudinal edges of said presser wall;

lengthwise the presser wall of the actuator button is oriented perpendicularly to the portions of the inner and outer peripheral edges of the façade plate that form the longitudinal edges of said branch of the façade plate;

the façade plate includes a slot through which the actuator rib of the actuator button passes so as to reach each locking arm; and on one of its faces, the actuator rib of the actuator button carries at least one bead that extends longitudinally over the height of said actuator rib, each bead being adapted to come into contact with an inner portion of the façade plate that extends along an edge of said slot, so as to index the standby position of said actuator button.

BRIEF DESCRIPTION OF THE DRAWINGS

The following description of non-limiting examples given with reference to the accompanying drawings, makes it possible to understand what the invention consists of and how it can be reduced to practice.

In the accompanying drawings.

DESCRIPTION OF THE PREFERRED EMBODIMENTS

Firstly, it should be observed that, in the description below, the various embodiments of the accessory of the invention are described as they appear to the user when they are flush mounted in a wall that receives them. In the description, the terms "front" and "rear" are thus defined relative to a user's point of view. Thus, a front face faces towards the user, while a rear face faces away from the user.

Furthermore, in the present description, elements of the various embodiments described and shown that are identical or similar are, whenever possible, referenced using the same references, and they are not described each time.

Figure 14:
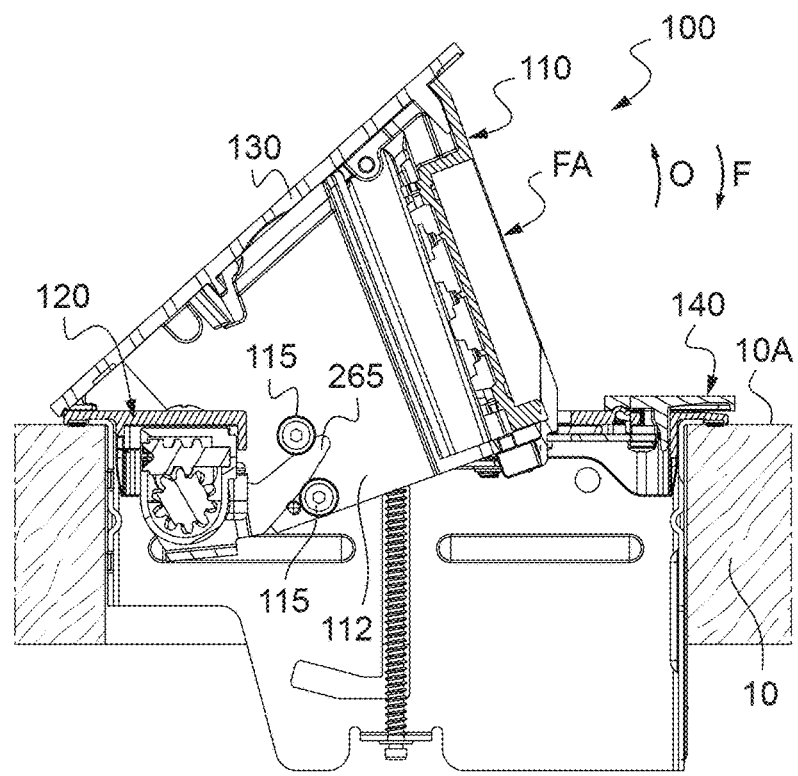
FIG. 14 is a section view similar to the view in FIG. 7 of the accessory, with its actuator button in its standby position and the accessory support in its raised position.
Figure 15:
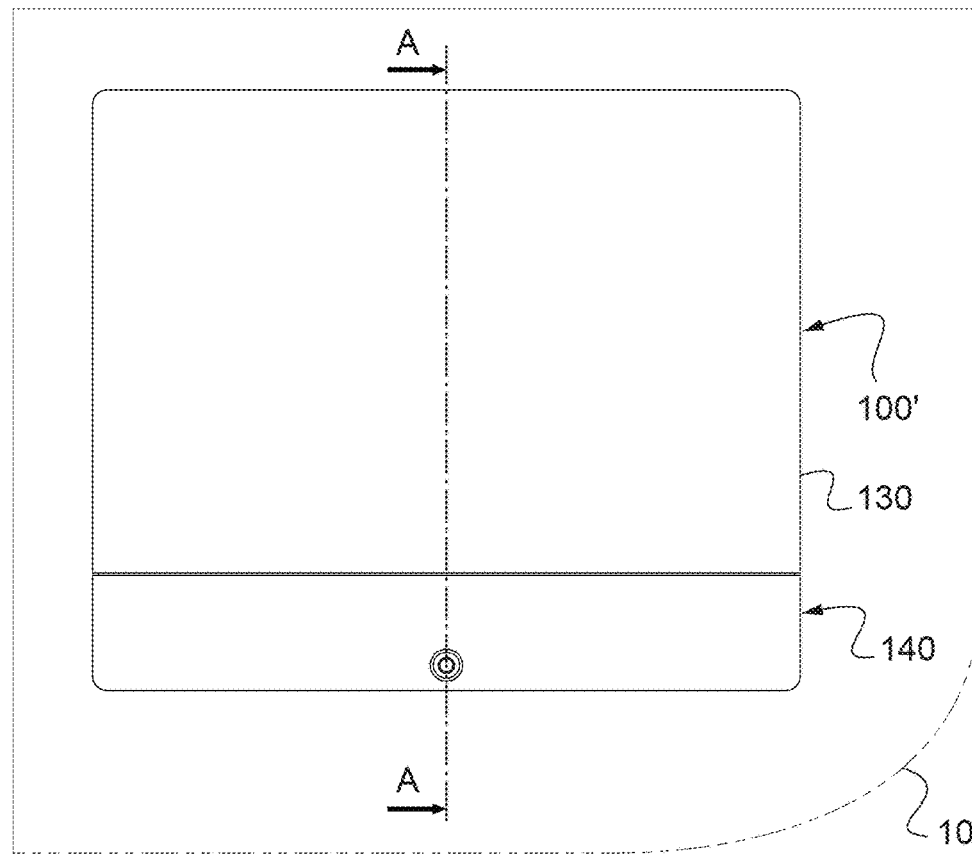
FIG. 15 is a diagrammatic plan view of another embodiment of the accessory of the invention, in a version that is simplified for greater clarity, i.e. with an accessory support that is not fitted with an accessory mechanism nor with the bottom fairing portion, the accessory being flush mounted in a reception wall and being in its lowered, standby position.

The various figures show two embodiments of an accessory 100; 100' for flush mounting in a reception wall 10 and having an accessory support 110 that is tiltable so as to disappear below the wall (see FIG. 1) or so as to be accessible by projecting therefrom (see FIGS. 14 and 18).

The reception wall 10 may be a wall of a piece of office furniture such as a work table or a storage unit, or it may be a raised floor.

Figure 2:
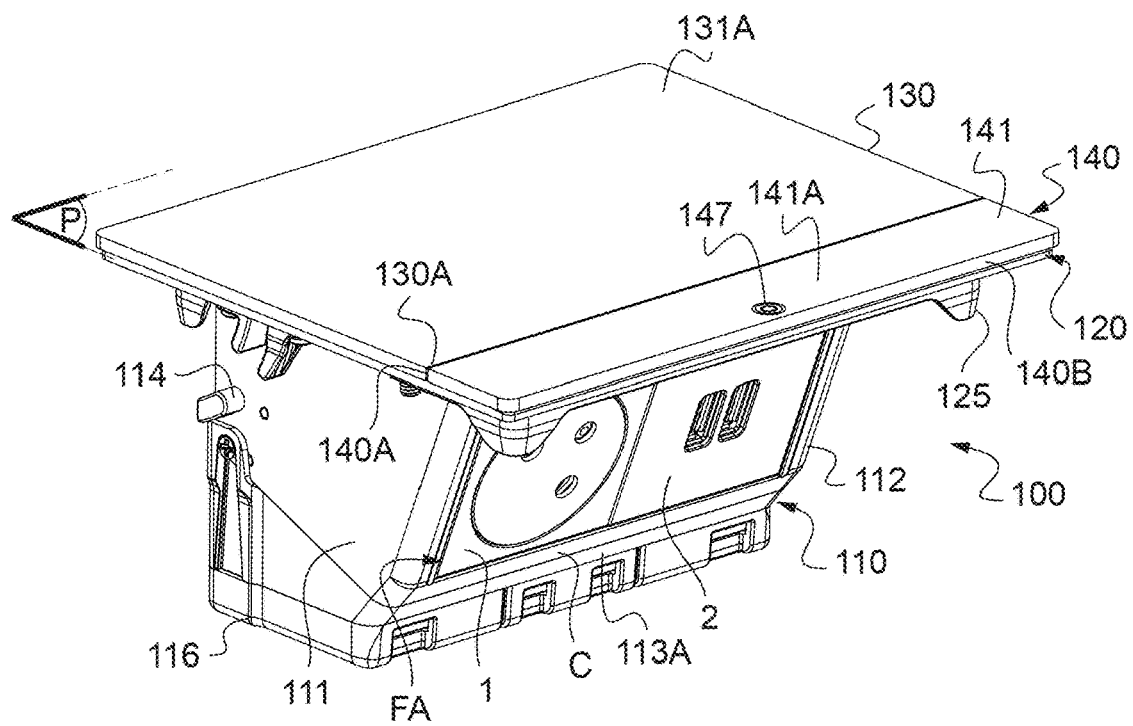
FIG. 2 is a diagrammatic three-quarter perspective view of the complete FIG. 1 accessory, when in its lowered position.

In the embodiments, the accessory 100; 100' is a multi-outlet block comprising a power outlet 1 and a two-port USB socket 2 (see FIG. 2).

Naturally, it could be any other accessory such as another multi-outlet block comprising a low-power outlet such as an RJ45 connector or a telephone socket, or it could be an antenna jack. It could be an electronic accessory.

Whatever the embodiment shown, the accessory 100; 100' comprises:
- a façade plate 120 presenting an opening 124;
- an accessory support 110 that is mounted to tilt through said opening 124 between a lowered position in which it extends below the façade plate 120 (see FIG. 2), and a raised position in which a major portion thereof extends above the façade plate 120 (see FIG. 11);
- a pivot system 200; 200' for pivoting the accessory support 110; and
- a locking system 300, releasable by means of an actuator button 140 that is distinct from the accessory support 110, for blocking the accessory support 110 in one or the other of its lowered or raised positions.

The two embodiments shown of the accessory 100; 100' differ merely by a specific element of the pivot system 200; 200'.

The following description is thus common to both embodiments, and the difference relating to the pivot system is described at the appropriate moment.

The façade plate 120 of the accessory 100; 100' is a part that is advantageously made of metal material.

It is for applying against the front face 10A of the reception wall 10 for receiving the accessory 100; 100'.

Figure 4:
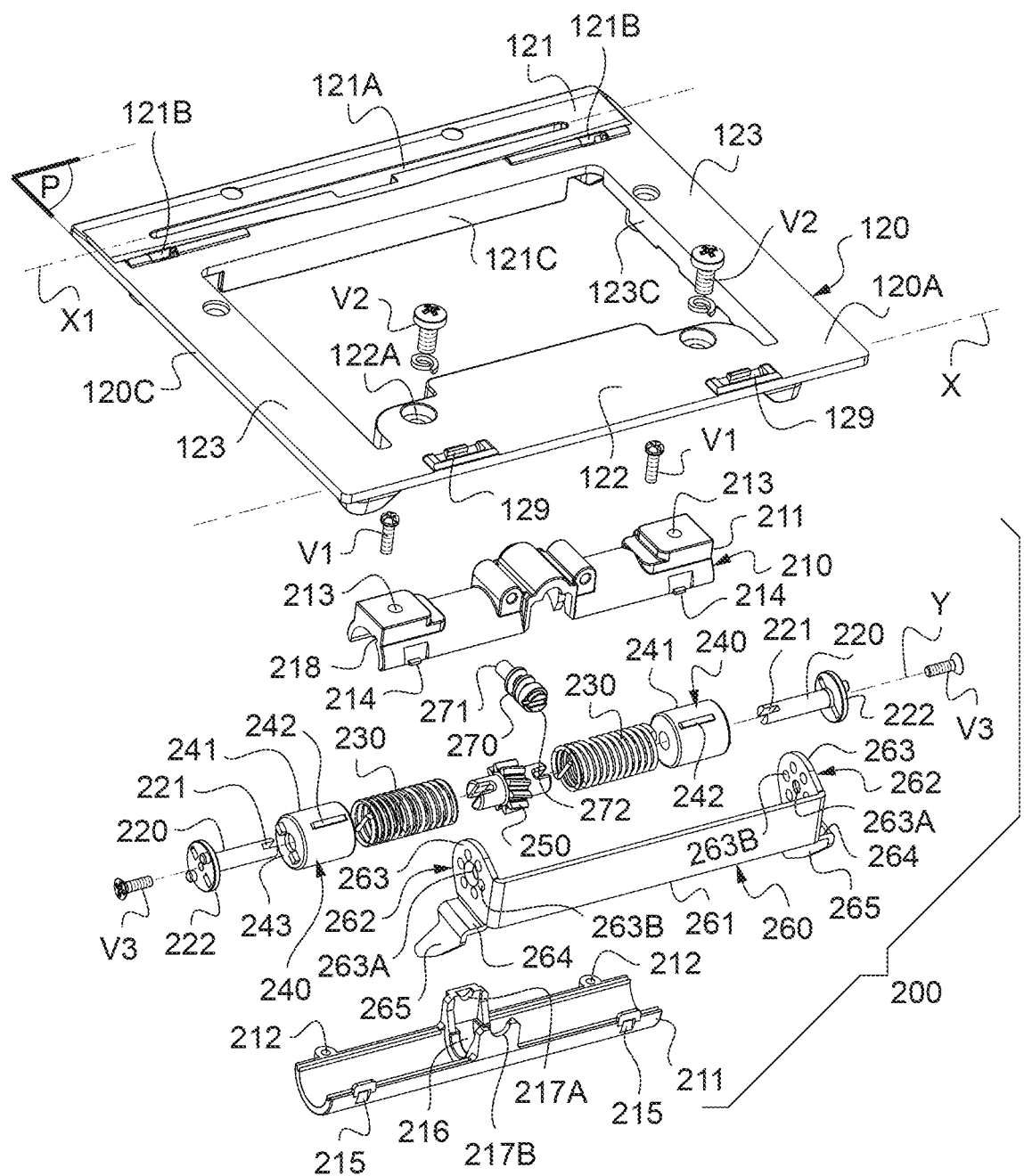
FIG. 4 is an exploded diagrammatic perspective view from above of the façade plate and of the pivot system for pivoting the FIG. 2 accessory.
Figure 5:
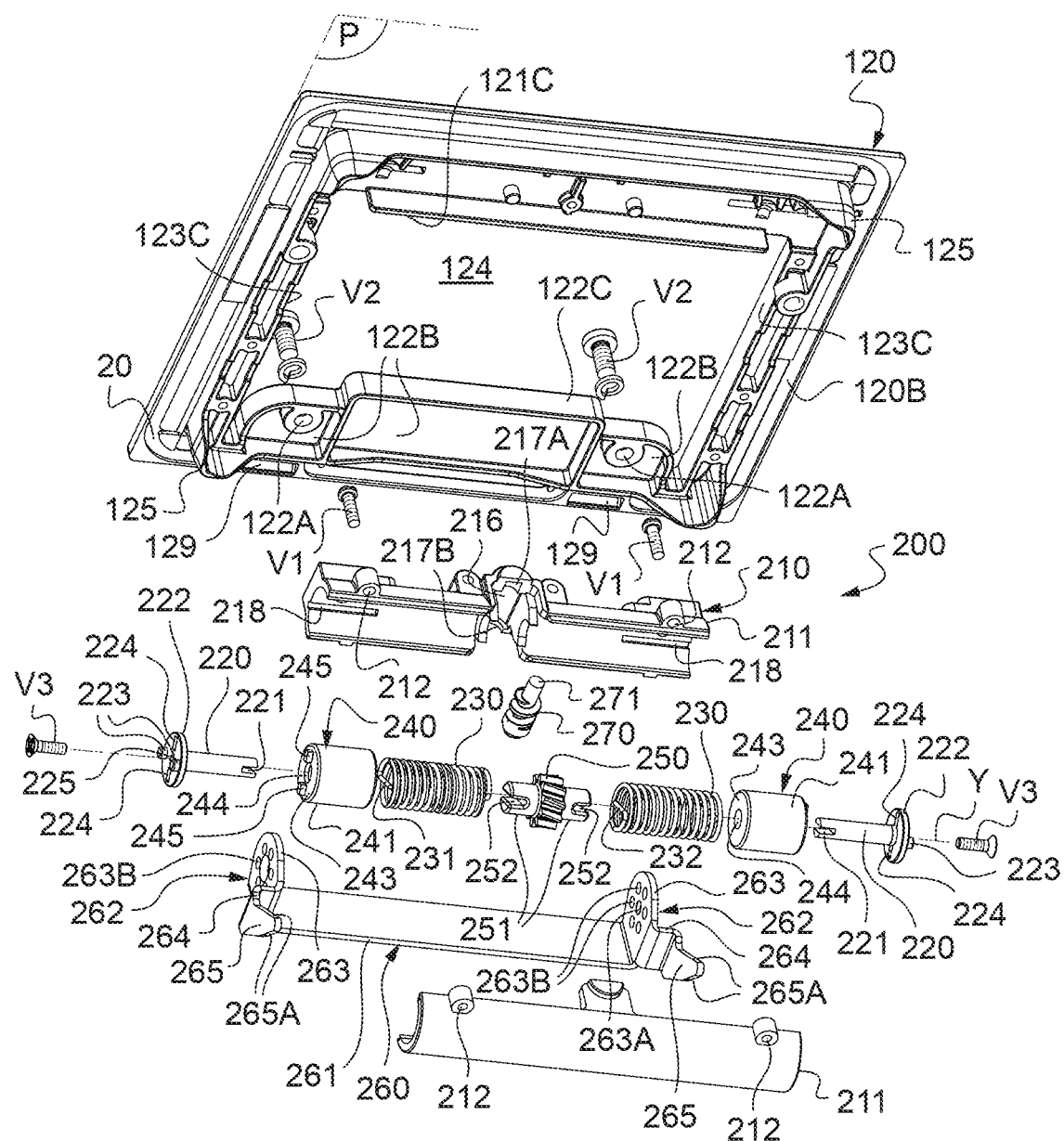
FIG. 5 is an exploded diagrammatic perspective view from below of the façade plate and of the pivot system for pivoting the FIG. 2 accessory.

As shown in particular in FIGS. 4 and 5, the façade plate 120 comprises a relatively flat frame that is defined between an outer peripheral edge 120C and an inner peripheral edge 121C, 122C, 123C. In these embodiments, the outer peripheral edge 120C presents an outline that is rectangular. Naturally, in a variant, provision could be made for the frame to present an outline that is square or circular.

The frame comprises four branches, namely a longitudinal front branch 121 and a longitudinal rear branch 122 that are connected together by two side branches 123.

In the embodiments shown, the inner peripheral edge 121C, 122C, 123C of the frame of the façade plate 120 defines a central opening 124 that is rectangular (see FIGS. 4 and 5), but in other variants that are not shown, provision could equally be made for the inner edge to define an opening that is square or circular. Provision could equally be made for the frame of the façade plate to include a plurality of openings, each for receiving a tiltable accessory support.

Figure 11:
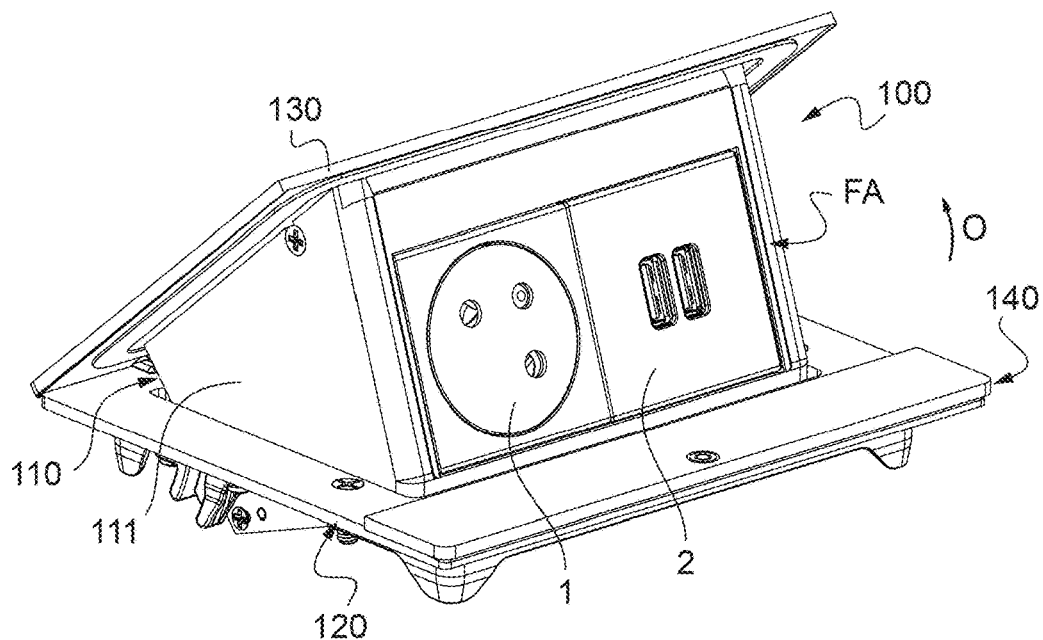
FIG. 11 is a diagrammatic three-quarter perspective view of the FIG. 2 accessory, in its raised position, in a simplified version in which the accessory support is not fitted with the bottom fairing portion.

The front face 120A of the frame of the façade plate 120 participates in the appearance of the unit (see FIG. 11). The rear face of the frame of the façade plate 120 carries technical elements such as reinforcing ribs 125, abutment elements 126 that define an abutment groove 127, chimneys 122A, and recesses 122B for housing and fastening various elements of the accessory 100, 100' that are described in greater detail below (see FIG. 5). Along the outer peripheral edge 120C of the frame of the façade plate 120, the rear face further includes a plane surface 120B for bearing against the reception wall. The plane bearing surface 120B of the frame of the façade plate 120 advantageously receives a gasket 20 for providing sealing against water and dust, the gasket 20 making it possible to fit closely over any potential irregularities on the front face 10A of the reception wall 10.

Advantageously, the accessory support 110 is made of metal material. It includes two main side walls 111, 112 that are parallel and that extend perpendicularly to the mean plane P of the frame of the façade plate 120 (see FIGS. 2 and 7).

As described in great detail below, at the rear of the support, i.e. remote from the façade of said support, the main side walls 111, 112 are indirectly connected to the two ends of a rotary drive shaft of the pivot system 200; 200'.

Figure 3:
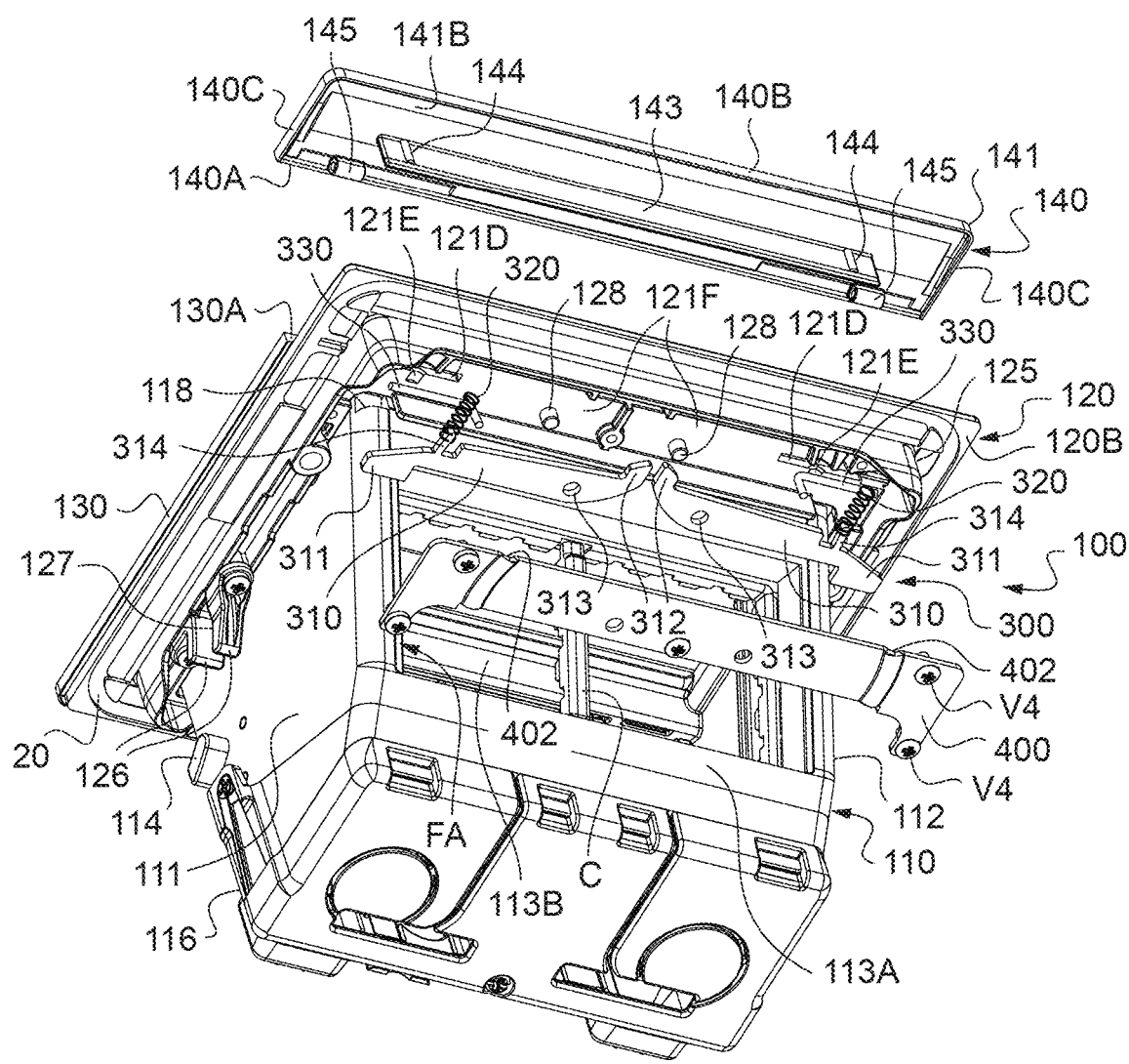
FIG. 3 is a partially-exploded diagrammatic perspective view from below of the FIG. 2 accessory.

At the front of the accessory support 110, i.e. the façade side of the support, the main side walls 111, 112 are connected together by a bottom cross bar 113A (see FIG. 3).

Figure 12:
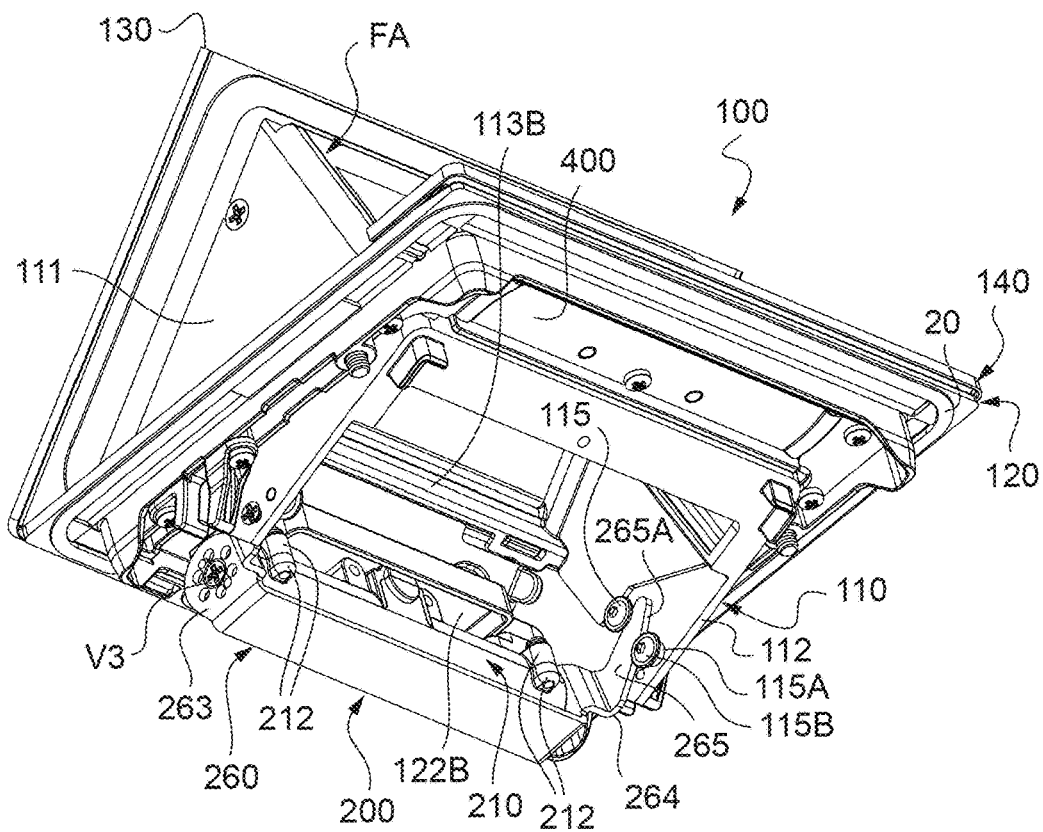
FIG. 12 is a diagrammatic perspective view from below of FIG. 11, in a simplified version in which the accessory support is not fitted with an accessory mechanism.

At the rear of the accessory support 110 but in front of the pivot system 200; 200', the main side walls 111, 112 are also connected together by a top cross bar 113B (see FIGS. 3 and 12).

The main side walls 111, 112 and the bottom and top cross bars 113A, 113B are made integrally as a single piece.

As shown in FIG. 3, a façade frame C is fitted between the two main side walls 111, 112 and the bottom cross bar 113A of the accessory support 110. It defines two square openings for accessing an internal space defined between the main side walls 111, 112 of the accessory support 110. The accessory mechanisms 1, 2 are fitted in the square openings so that firstly the bases of the mechanisms are snap-fastened or engaged on the uprights of the façade frame C and extend inside said internal space, and so that the trim plates close said square openings (see FIG. 2).

As shown in FIG. 2, the functional façade FA of the accessory 100 is formed by the functional front faces of the trim plates of said accessory mechanisms 1, 2, by the front face of the façade frame C that surrounds said trim plates, and by the edges both of the main side walls 111, 112 and of the bottom cross bar 113A.

Figure 13:
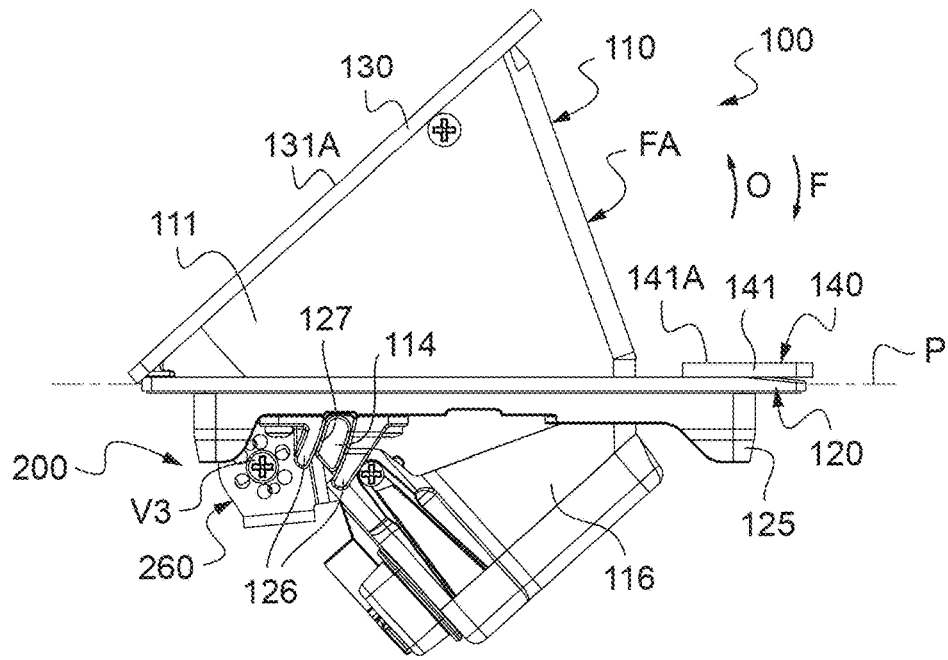
FIG. 13 is a side view of the FIG. 2 accessory, in its raised position.

On its outside face in the proximity of its rear edge remote from the functional façade FA of the accessory 100; 100', one of the main side walls 111 of the accessory support 110 carries an abutment element 114 of oblong outline, for engaging in the abutment groove 127 of the façade plate 120 when the accessory support 110 tilts from its lowered position to its raised position. Bringing the abutment element 114 into abutment against the end wall of the abutment groove 127 makes it possible to index the stable raised position of the accessory support 110 (see FIG. 13).

In the bottom portion, remote from the top cross bar 113B, a bottom fairing portion 116, fastened by means of screws to the main side walls 111, 112 of the accessory support 110, closes the internal space defined between said main side walls 111, 112 (see FIGS. 2 and 3).

In the top portion, remote from the bottom cross bar 113A, a cover 130 is secured by means of screws to the two main side walls 111, 112 of the accessory support 110. The cover 130 is formed mainly of a plate that extends perpendicularly to the main side walls 111, 112. It closes the internal space defined between said main side walls 111, 112 and it extends beyond either side of the internal space (see FIG. 3).

Figure 1:
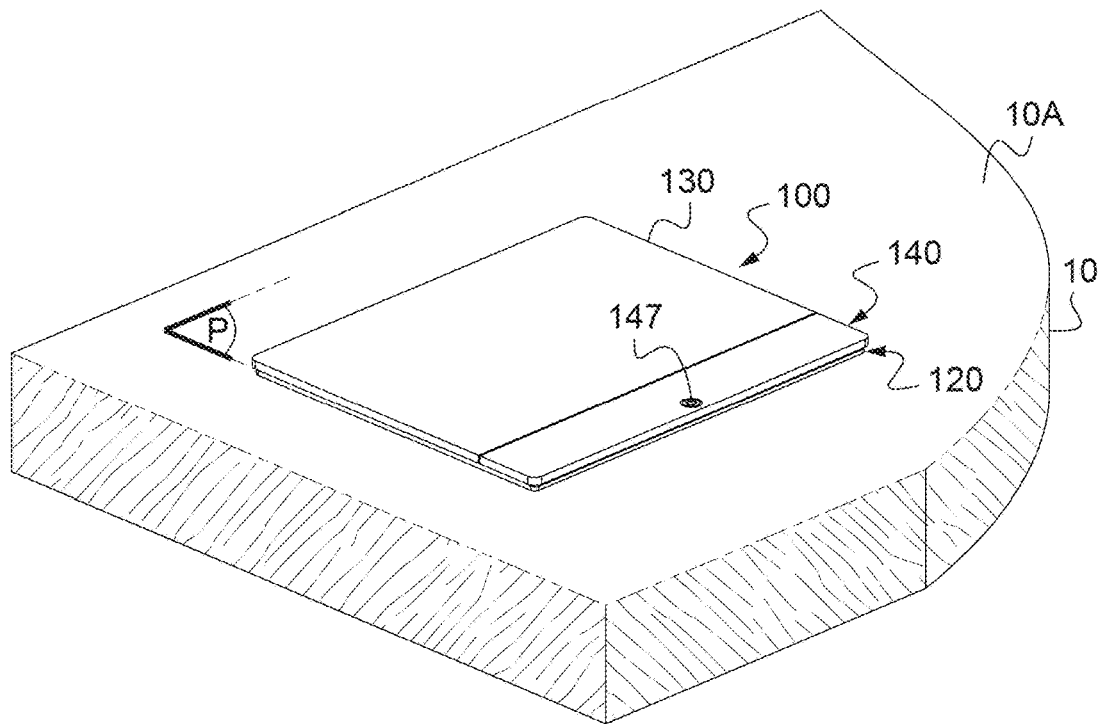
FIG. 1 is a diagrammatic front view in perspective of a preferred embodiment of an accessory of the invention, flush mounted in a reception wall and shown in its lowered, standby position.

The cover 130 is for closing the central opening 124 of the façade plate 120 when the accessory support 110 is tilted in its lowered position (see FIGS. 1 and 2). As shown in FIGS. 1 and 2, the cover 130 presents a shape that is rectangular, having a length that is a little greater than the length of the longitudinal front and rear branches 121, 122 of the frame of the façade plate 120, and having a width that is less than the length of the side branches 123 of the frame of the façade plate 120.

The width is decreased by the width of the actuator button 140 for actuating the locking system 300, which actuator button covers the entire longitudinal front branch 121 of the frame of the façade plate 120 in this embodiment.

As shown more particularly in FIG. 2, when the accessory support 110 is in its lowered position, the cover 130 extends in alignment with the actuator button 140 positioned in a standby position, covering the entire portion of the façade plate 120 that is not covered by the actuator button 140. The cover 130 then presents a longitudinal edge 130A that is adjacent to an inner longitudinal rim 140A of the actuator button 140 such that the front face 131A of the cover 130 and the front face 141A of the actuator button 140 form a finishing front face of the accessory 100 that is attractive.

The cover 130 is mounted to pivot on the frame of the façade plate 120 about an axis X that is parallel to a longitudinal side of said façade plate 120 (see FIG. 4). To do this, on its rear face and along the longitudinal edge remote from the longitudinal edge 130A that is adjacent to the actuator button 140, the cover 130 carries two projections, not shown in the figures, that present a curved profile, and that are engaged in two slots 129 provided along the corresponding longitudinal side of the frame of the façade plate 120 (see FIG. 4). The curved profile of said projections co-operates in slidable manner with a complementary curved profile provided on the inside walls of said slots 129. The sliding co-operation between the projections of the cover 130 and the curved inside walls of the slots 129 of the façade plate 120 enables the cover 130 to pivot relative to the façade plate 120, about the axis X.

At the rear, in this embodiment and as shown more particularly in FIGS. 4 and 5, the pivot system 200; 200' includes, inside a casing 210, a rotary drive shaft 220, two dampers 240, and two torsion springs 230 under stress associated with the rotary drive shaft 220. The pivot system 200; 200' further includes two parallel tabs 265; 265' that are arranged so as to transmit the pivot movement of the rotary drive shaft 220 to said accessory support 110.

In a variant that is not shown, provision could be made for the pivot system to include a single torsion spring associated with a single damper.

The casing 210 presents a shape that is generally cylindrical and that is elongate along an axis Y. It presents two circular openings at its ends. It is made up of two shells 211 that are generally semi-cylindrical, that are positioned edge to edge, and that are secured to each other along their longitudinal edges. The means for securing the two shells 211 comprise a snap-fastener system and a screw-fastener system. The snap-fastener system comprises, along a longitudinal edge of one of the shells 211, two teeth 214, and along the corresponding longitudinal edge of the other shell 211, two windows 215 in which the two teeth 214 are snap-fastened. Along the other two corresponding longitudinal edges of the two shells 211, the screw-fastener system comprises two tapped chimneys 212 in which respective ones of two screws V1 are screw-fastened (see FIG. 12).

In the embodiment shown in FIGS. 4 and 5, at its center, the casing 210 includes a shape 216 that is suitable for housing a toothed wheel 250 that co-operates with the thread of a worm screw 270 having an end 271 that is engaged in an internal notch 217A of the casing 210, and having a driver head 272 that is accessible to an installer through a circular opening 217B in a side face of the casing 210.

Two cylindrical lugs 251 associated with the toothed wheel 250 extend along the axis Y on either side of said toothed wheel 250. The toothed wheel 250 presents the axis Y as its pivot axis, and the worm screw 270 extends along an axis that is perpendicular to the axis Y, it turns about an axis that is perpendicular to the axis Y, while co-operating with the set of teeth of the toothed wheel 250.

Each cylindrical lug 251 is slotted with an axial slot 252 that opens out onto the free end of the lug 251.

The toothed wheel 250 and the two cylindrical lugs 251 are made integrally as a single piece made of metal.

Inside the casing 210, two rotary drive systems are provided in symmetrical manner, on either side of the toothed wheel 250.

Each rotary drive system includes a half shaft 220, the two half shafts are in alignment along the axis Y with said cylindrical lugs 251, and form said rotary drive shaft 220 of axis Y.

Each half shaft 220 is housed at a respective end of the casing 210. Each half shaft 220 presents an end that is provided with a slot 221, and an end that is provided with a disk 222. The disk 222 of each half shaft 220 closes the corresponding circular end opening of the casing 210.

Each rotary drive system includes a damper 240 that is associated with the half shaft 220.

The damper 240 is entirely conventional. It comprises an outer cylinder 241 and an inner cylinder 244 that are coaxial around the axis Y, and a viscous material that is provided between the two cylinders. On its outside face, the outer cylinder 241 carries a spline 242 that extends along a generator line of the outer cylinder 241 (see FIG. 4). The spline 242 is received in a groove 218 that is recessed into the inside face of one of the shells 211 of the casing 210, so that the outer cylinder 241 of the damper 240 is stationary in the casing 210. The inner cylinder 244 of the damper 240 is capable of turning inside the outer cylinder 241, rubbing on the viscous material. Each end of the inner cylinder 244 is fitted with an annular disk 243 that closes the cylindrical internal space that is provided between the outer and inner cylinders 241 and 244, and that is filled with viscous material.

In each rotary drive system, the half shaft 220 is slid through the inner cylinder 244 of the damper 240 so that its slotted end 221 catches the end 231 of a torsion spring 230. One of the annular disks 243 of the inner cylinder 244 of the damper 240 carries lugs 245 that are engaged in openings 224 that are correspondingly provided in the disk 222 that is provided at the end of the half shaft 220 that is slid through the inner cylinder 244 of the damper 240 so as to connect the half shaft 220 to said inner cylinder 244 of the damper 240.

Each rotary drive system includes a torsion spring 230. One end 231 of the torsion spring 230 is connected to the slotted end 221 of the half shaft 220, and the other end 232 of the torsion spring 230 is engaged in the slot 252 of a cylindrical lug 251 that is connected to the toothed wheel 250, so that said other end 232 is connected to the cylindrical lug 251 (see FIG. 5).

In order to adjust the torsion stress of the two torsion springs 230 of the pivot system 200, it suffices for an installer to screw or unscrew the worm screw 270 by means of a screwdriver having a tip that is engaged in the slot of the driver head 272 of said worm screw 270, so as to turn the toothed wheel 250 in the appropriate direction. The toothed wheel 250 turns the two lugs 251 which then simultaneously cause the two torsion springs 230 either to be put under stress or else to be relaxed.

Adjusting the stress of the two torsion springs 230 makes it possible to adjust the pivot torque of the two half shafts 220 and thus of the rotary drive shaft 220.

The pivot torque is damped by means of the two dampers 240.

As shown in FIGS. 5 and 12, the closed casing 210 that houses all of the above-described elements is housed in three recesses 122B that are provided on the rear face of the longitudinal rear branch 122 of the frame of the façade plate 120, in front of said slots 129 for pivotally mounting the cover 130. The casing 210 is secured to the façade plate 120 by means of screws V2 that are engaged through two chimneys 122A that are provided on the rear face of the façade plate 120, and that open out to the front face 120A of the longitudinal rear branch 122 of the frame of said façade plate 120, the screws V2 being screw-fastened in the tapped ducts 213 that are provided in one of the shells 211 of the casing 210.

As shown more particularly in FIGS. 4, 5, and 12, and in very advantageous manner, the pivot system 200; 200' includes a transmission part 260; 260' that is a rigid single-piece part positioned on the outside of the casing 210.

The transmission part 260; 260' is in the form a U-shape or a channel section part with a longitudinal portion 261 and two side portions 262.

The longitudinal portion 261 of the transmission part 260; 260 extends along the outside of the casing 210, parallel to the axis Y of the rotary drive shaft 220, and said side portions 262 extend beyond the ends of said casing 210 so that the transmission part 260; 260' encompasses the rotary drive shaft 220.

The rotary drive shaft 220 is connected to the single-piece transmission part 260; 260' at the roots of the two side portions 262, with the free ends of the side portions forming said tabs 265; 265' and co-operating in slidable manner with said accessory support 110.

The root of each of said side portions 262 of the transmission part 260; 260' is a cheek plate 263 that is connected to said longitudinal portion 261 and that presents a circular outline.

Each cheek plate 263 is perforated with a central orifice 263A and with a plurality of peripheral orifices 263B that are arranged in a circle around the central orifice 263A (see FIGS. 4 and 5). On its outside face, the end disk 222 of each half shaft 220 carries two lugs 223 that are engaged in two peripheral orifices 263B of a respective cheek plate 263 of the transmission part 260 for connecting thereto. Furthermore, each half shaft 220 includes a tapped duct 225 that opens out onto the outside face of the end disk 222. A screw V3 is then engaged through the central orifice 263A of each cheek plate 263 of the transmission part 260; 260' and is screw-fastened in the tapped duct 225 of the corresponding half shaft 220. In this way, both cheek plates 263 of the transmission part 260; 260' are securely secured to the two end disks 222 of the rotary drive shaft 220 (see FIG. 12).

Advantageously, said transmission part 260; 260' is made by cutting and folding sheet metal. It is preferably made of steel.

In a variant, said transmission part may be made by molding a metal material such as Zamak.

Figure 6:
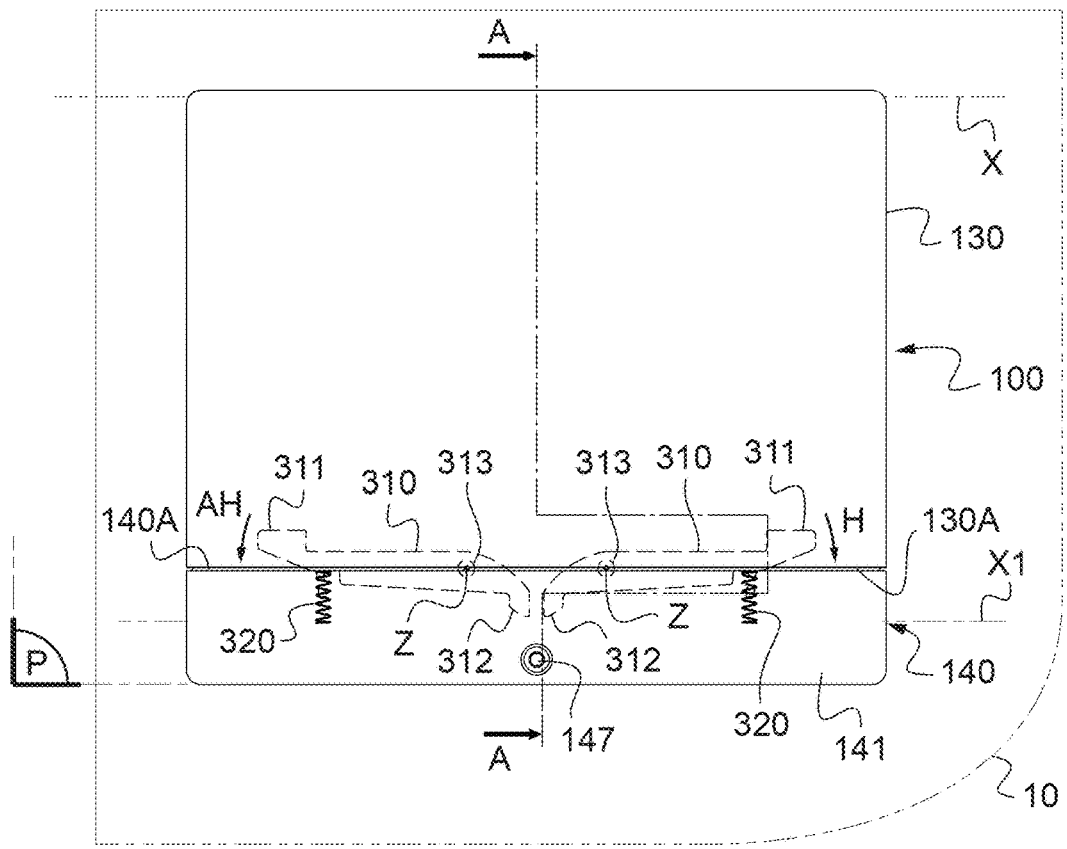
FIG. 6 is a diagrammatic plan view of the FIG. 2 accessory in a version that is simplified for greater clarity, i.e. with an accessory support that is not fitted with an accessory mechanism nor with the bottom fairing portion, the electrical accessory being flush mounted in a reception wall and being in its lowered, standby position.
Figure 7:
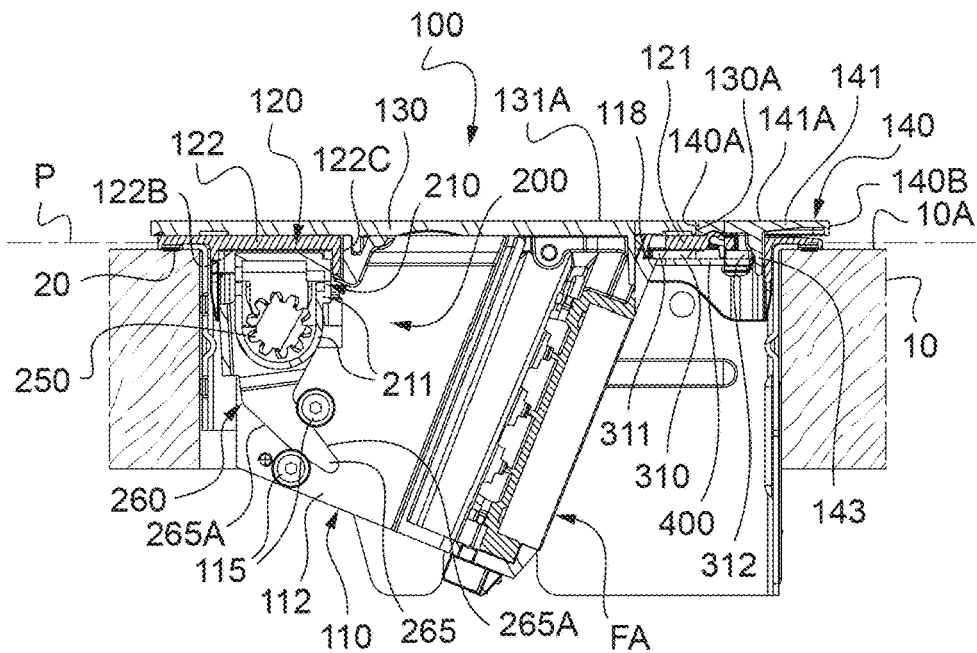
FIG. 7 is a section view on plane A-A in FIG. 6.

In the first embodiment of the invention shown in FIGS. 1 to 14, each of the two tabs 265 includes two outer longitudinal edges 265A that are engaged in slidable manner in groove means 115 that project from the inside face of each main side wall 111, 112 of the accessory support 110 (see in particular FIGS. 7 and 12).

In this embodiment, and as shown in FIG. 4, each tab 265 presents the form of a plate that tapers to a point and that extends from a step 264 that establishes the junction between the tab 265 and the corresponding cheek plate 263 of the single-piece transmission part 260. The cheek plate 263, the step 264, and the tab 265 together form the corresponding side portion 262 of the transmission part 260.

The two outer longitudinal edges 265A of each plate 265 that tapers to a point are engaged in slidable manner in said groove means provided on the inside face of the corresponding main side wall 111, 112 of the accessory support 110.

As shown more particularly in FIG. 12, said groove means comprise two centering pegs 115, each presenting a head 115B and a cylindrical anchor 115A, which two centering pegs 115 are arranged on either side of a respective tab 265 so that each outer longitudinal edge 265A of said tab 265 is engaged in slidable manner below the head 115B of a centering peg 115 and against the outside surface of the cylindrical anchor 115A of said centering peg 115. The outside surface of the cylindrical anchor 115A of each centering peg 115 is free to turn about the axis of said cylindrical anchor 115A.

The outer longitudinal edges 265A of said tabs 265 present a length that is adapted so that the sliding of the tabs 265 in said groove means provided on the accessory support 110 causes said accessory support to tilt from its lowered position to its raised position and vice versa.

In the second embodiment of the invention shown in FIGS. 15 to 18, each of the two tabs 265' includes two inner longitudinal edges 266'A that are engaged in slidable manner in groove means 115 that project from the inside face of each main side wall 111, 112 of the accessory support 110. In this embodiment, each tab 265' also presents the form of a plate that extends from a step that establishes the junction between the tab 265' and the corresponding cheek plate of the transmission part 260'. The cheek plate, the step, and the tab 265' together form the corresponding side portion of the transmission part 260'.

Figure 16:
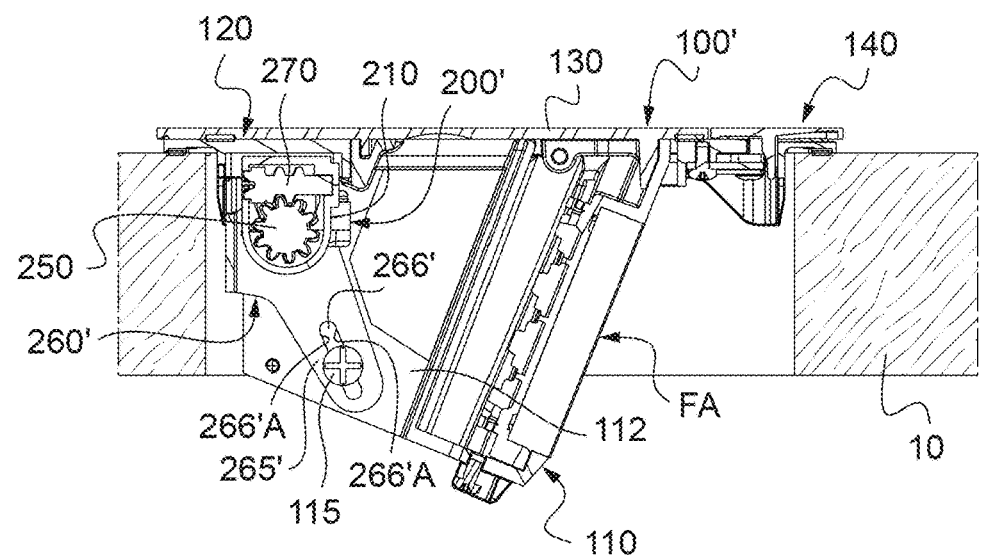
FIG. 16 is a section view on plane A-A in FIG. 15.
Figure 17:
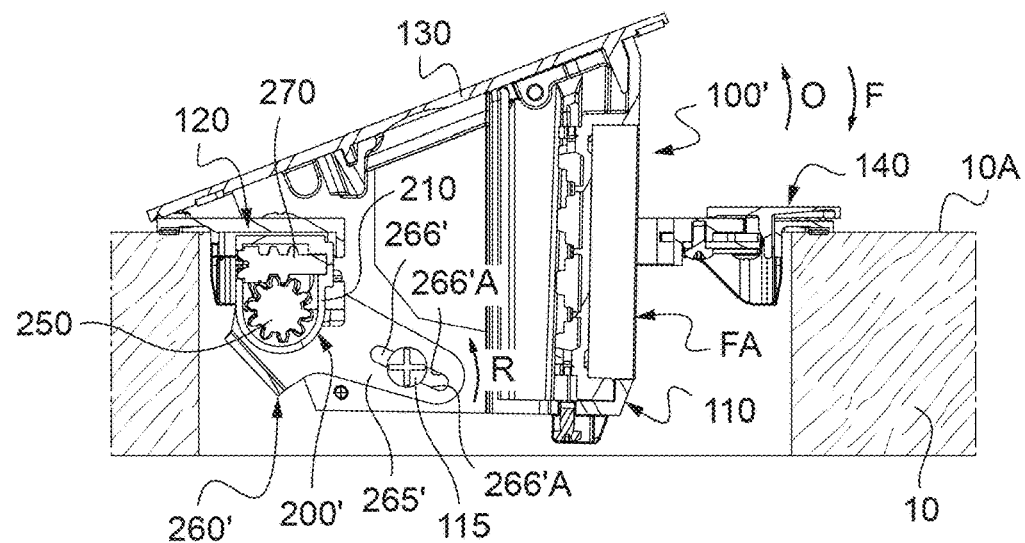
FIG. 17 is a section view similar to the view in FIG. 16 of the accessory, with the actuator button in its standby position and the accessory support mid-way between its lowered position and its raised position.

In this embodiment, and as shown more particularly in FIGS. 16 and 17, the two inner longitudinal edges 266'A of each tab 265' are the two parallel longitudinal edges of an oblong slot 266' that is provided in the plate that forms said tab 265'.

For each tab 265', said groove means comprise a centering peg 115 with a head and a cylindrical anchor, the two inner longitudinal edges 266'A of said tab 265' being engaged in slidable manner below the head of the centering peg and against the outside surface of the cylindrical anchor of said centering peg 115. Likewise in this embodiment, said outside surface of the cylindrical anchor of each centering peg is free to turn about the axis of said cylindrical anchor.

The length of the oblong slot 266' of each tab 265' is adapted so that the sliding of the tabs 265' in said groove means provided on the accessory support 110 causes said accessory support to tilt from its lowered position to its raised position and vice versa.

Advantageously, the transmission part 260; 260' makes it possible to distribute the pivot forces exerted by the pivot system 200; 200' uniformly over the accessory support 110, and to remedy any alignment fault that might exist between the ends of the rotary drive shaft 220 and the accessory support 110.

Thus, by means of said transmission part 260; 260', the accessory support 110 of the accessory 100; 100' is tilted from its lowered position to its raised position in fluid manner, without jamming or becoming offset. This tilting movement is described in greater detail below in the context of the description of the general operation of the accessory 100; 100'.

Whatever the embodiment shown, and as shown more particularly in FIGS. 3 and 6, the locking system 300 for locking the accessory 100 comprises firstly at least one locking arm 310 that is movable between a locking position in which a blocking portion 311 of said locking arm 310 bears against a blocking surface 118 of the accessory support 110 (see FIG. 7), and a release position in which said blocking portion 311 is spaced apart from said blocking surface 118 (see FIG. 8), and secondly an actuator button 140, distinct from the accessory support 110, that co-operates with said locking arm so as to cause the locking arm 310 to move. The actuator button 140 is tiltable about a tilt axis X1 that extends parallel to the mean plane P of said façade plate 120 (see FIGS. 4 and 6).

The tilt axis X1 of the actuator button 140 is parallel to the pivot axis X of the cover 130 (see FIG. 6).

In this embodiment, two locking arms 310 are preferably provided that are caused to move simultaneously by said actuator button 140, and the accessory support 110 correspondingly includes two blocking surfaces 118.

The blocking surfaces 118 form portions of two notches that are made in the front edge of the two main side walls 111, 112 of the accessory support 110.

As shown more particularly in FIG. 3, the two locking arms 310 are positioned below the longitudinal front branch 121 of the frame of the façade plate 120, in two recesses 121F of the rear face of said façade plate 120.

Each locking arm 310 is in the form of a plate that is made of metal material for example, and that extends lengthwise between one end portion 311 that forms said blocking portion, and an opposite other end portion 312 that forms an actuator portion.

As shown in FIGS. 3 and 6, the two locking arms 310 are positioned so that their main faces are parallel to said mean plane P of the façade plate 120, and their respective actuator portions 312 are positioned close to each other in a central region of the longitudinal front branch 121, which central region is situated mid-way between two opposite sides of the façade plate 120.

As shown in FIGS. 3 and 6, in said recess 121F of the façade plate 120, each locking arm 310 is mounted to pivot on the façade plate 120 about a pivot axis Z that is perpendicular to said mean plane P of the façade plate 120. The pivot axis Z is thus perpendicular to the tilt axis X1 of the actuator button 140. The pivot axes Z of the two locking arms 310 intersect the mean plane P of the façade plate 120 at positions lying on a line that is parallel to the axes X and X1 (see FIG. 6) and to the portions of the inner and outer peripheral edges 121C and 120C of the façade plate that form the longitudinal edges of said longitudinal front branch 121 of the façade plate 120.

As shown in FIGS. 3 and 6, each locking arm 310 is pivoted by engaging, with clearance, in a housing 313 of circular outline of the locking arm 310, a cylindrical lug 128 projecting from the façade plate 120. Preferably, each locking arm 310 includes a circular opening 313 receiving said cylindrical lug 128 projecting from the façade plate 120.

In FIG. 6, it should be observed that the circular opening 313 of each locking arm 310 is situated in the proximity of the actuator end 312 of said locking arm 310 so that the pivot axis Z is close to the actuator end 312 and far enough away from the blocking end 311 of the locking arm 310. Thus, pivoting the locking arm 310 through a small angle about the pivot axis Z, in a clockwise direction represented by arrow H or in a counterclockwise direction represented by arrow AH, suffices, given the lever arm, to cause the blocking portion 311 of said locking arm 310 to move in angular and satisfactory manner between its locking and release positions.

The actuator button 140 includes a presser wall 141 that is positioned above the longitudinal front branch 121 of the frame of the façade plate 120. The presser wall 141 presents a front face 141A that forms a presser surface to be pressed by a user's finger. The actuator button 140 is adapted to tilt about the tilt axis X1 between a standby position, in which said front face 141A of said presser wall 141 extends substantially parallel to the mean plane P of the façade plate 120 (see FIGS. 7, 10, and 13), and an actuated position, tilted towards the outside of the façade plate 120, in which said presser wall 141 moves closer to the outer peripheral edge 120C of said façade plate 120, with its front face 141A sloping by an angle A (of about 10°) relative to the mean plane P of the façade plate 120 (see FIGS. 8 and 9).

In order to co-operate with each locking arm 310, the actuator button 140 advantageously includes an actuator rib 143 of height that extends rearwards from the rear face 141B of the presser wall 141, substantially perpendicularly to said presser wall 141. The actuator rib 143 is continuously in contact with each locking arm 310. More particularly, the actuator rib 143 is continuously in contact with the actuator portions 312 of the locking arms 310.

As shown in particular in FIGS. 4 and 7, the façade plate 120 includes a slot 121A through which the actuator rib 143 of the actuator button 140 passes so as to reach the tip of the actuator portions 312 of the locking arms 310.

Advantageously, on one of its faces, the actuator rib 143 of the actuator button 140 carries at least one bead 144 that extends longitudinally over the height of said actuator rib 143 (see FIG. 3). Each bead 144 is adapted to come into contact with an inner portion of the façade plate 120 that extends along an edge of said slot 121A, so as to index the standby position of said actuator button 140.

In the embodiments of the invention shown in the various figures, lengthwise the presser wall 141 of the actuator button 140 is oriented parallel to the portions of the inner and outer peripheral edges 121C and 120C of the façade plate 120 that form the longitudinal edges of said longitudinal front branch 121 of the façade plate 120.

Advantageously, said presser wall 141 of the actuator button 140 presents a large surface area that is rectangular, and a length that is a little greater than the length of said longitudinal front branch 121 of the frame of the façade plate 120.

The presser wall 141 is bordered by two inner and outer longitudinal rims 140A, 140B and by two transverse rims 140C.

In this embodiment, the presser wall 141 covers the entire front face of said longitudinal front branch 121 of said façade plate 120, and the outer longitudinal rim 140B and the transverse rims 140C of the actuator button 140 cover a portion of said outer peripheral edge 120C of the façade plate 120, which portion of the outer peripheral edge 120C forms firstly the entire outer longitudinal edge 120C of said longitudinal front branch 121, and secondly a portion of the outer transverse edges of the branch 121.

In this embodiment, lengthwise the actuator rib 143 extends parallel to the longitudinal edges of said presser wall 141. Two beads 144 are then provided, positioned respectively in the proximity of the two ends of the actuator rib 143.

As already described above, when the accessory support 110 is locked in its lowered position and the actuator button 140 is positioned in its standby position, the cover 130 extends in alignment with the actuator button 140, and its longitudinal edge 130A is adjacent to the inner longitudinal rim 140A of the actuator button 140 such that the front face 131A of the cover 130 and the front face 141A of the presser wall 141 of the actuator button 140 form a finishing plane front face of the accessory 100 that is attractive.

The actuator button 140 is a part that is independent of the accessory support 110.

In order to tiltably mount the actuator button 140 on the façade plate 120, two cylindrical conduits 145 are provided on the rear face 141B of the presser wall 141 of the actuator button 140, along the inner longitudinal rim 140A and in alignment along the axis X1, as shown in FIG. 3. On its rear face, the façade plate 120 correspondingly includes two grooves 121D of cylindrical profile, having axes that are in alignment along the axis X1. Each of the grooves 121D includes a perpendicular rim 121E of cylindrical profile, and in said façade plate 120 there are provided two openings 121B that are positioned on the path of the two grooves 121D (see FIG. 4).

The two cylindrical conduits 145 of the actuator button 140 are engaged through the openings 121B of the façade plate 120 so as to be accessible below said façade plate 120 in the axis of said grooves 121D. Two rods 330 are slid into the grooves 121D, through the cylindrical conduits 145, and then an end of each of the rods 330 is folded down at a right angle, so as to be engaged in the corresponding perpendicular rim 121E. The two rods 330 secure the actuator button 140 to the façade plate 120 and form an axis (that extends along the axis X1) about which the cylindrical conduits 145 engaged in said openings 121B pivot.

In addition, return means are advantageously provided that continuously urge each locking arm 310 into its locking position.

Said return means are resilient means, springs 320, that are compressed between each locking arm 310 and said actuator rib 143 of the actuator button 140, such that they likewise act continuously on said actuator button 140 so as to return it towards its standby position. Each locking arm 310 includes a pin 314 onto which an end of the spring 320 is slid, so that said spring is positioned correctly. The other end of each spring 330 is merely positioned to bear against said actuator rib 143 of the actuator button 140.

Finally, at the rear of the façade plate 120, the various elements of the locking system 300 are protected by a fairing plate 400 that is fastened on the rear face of the façade plate 120 by screws V4 that are screw-fastened in tapped orifices of the façade plate 120. On an inside face, the fairing plate 400 includes two grooves 402 that hold the two folded ends of the rods 330 in place.

With reference firstly to FIGS. 7 to 14 and secondly to FIGS. 15 to 18, opening the accessory 100; 100' is described below.

In FIGS. 6, 7, 15, and 16, the accessory 100; 100' is shown in its closed state with its accessory support 110 held in its lowered position below the façade plate 120 by the locking arms 310 urged into their locking position by the springs 320. In the locking position, the blocking portions 311 of the locking arms 320 are engaged in the corresponding notches of the accessory support 110, bearing against the blocking surfaces 118. In the closed state, the cover 130 extends in alignment with the actuator button 140, and its longitudinal edge 130A is adjacent to the inner longitudinal rim 140A of the actuator button 140 such that the front face 131A of the cover 130 and the front face 141A of the presser wall 141 of the actuator button 140 form a finishing plane front face of the accessory 100; 100' that is attractive.

Figure 8:
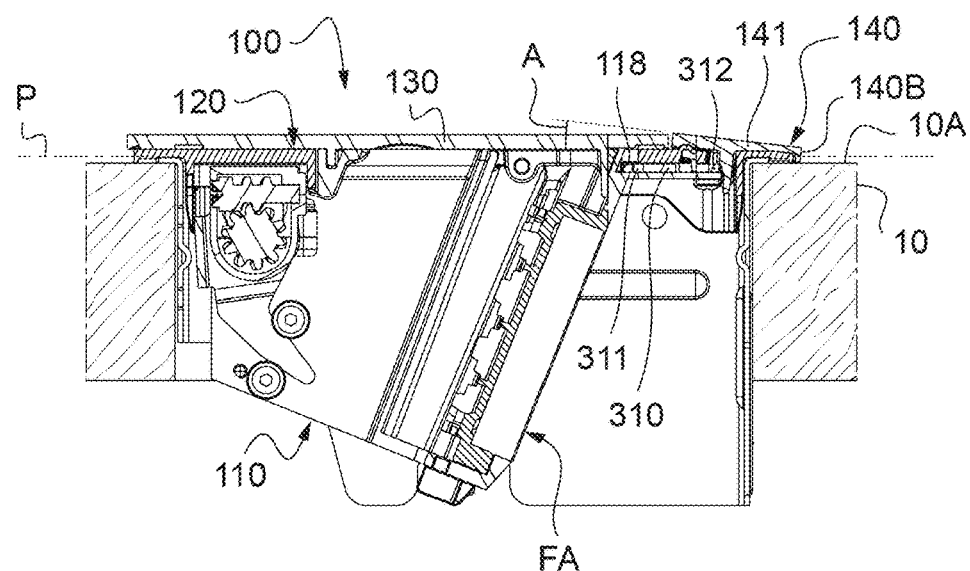
FIG. 8 is a section view similar to the view in FIG. 7 of the accessory, with its actuator button in its actuated position.
Figure 9:
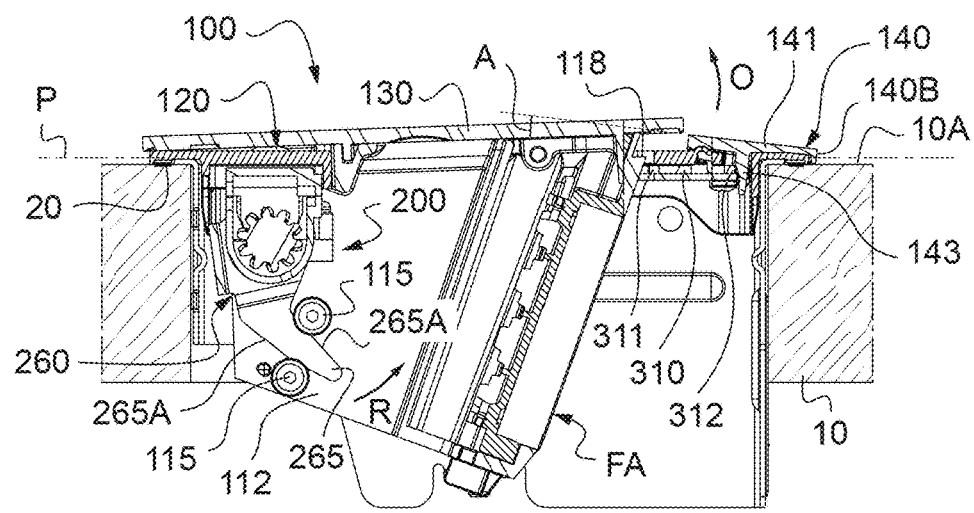
FIG. 9 is a section view similar to the view in FIG. 7 of the accessory, with its actuator button in its actuated position and the accessory support released, which is starting to rise.
Figure 10:
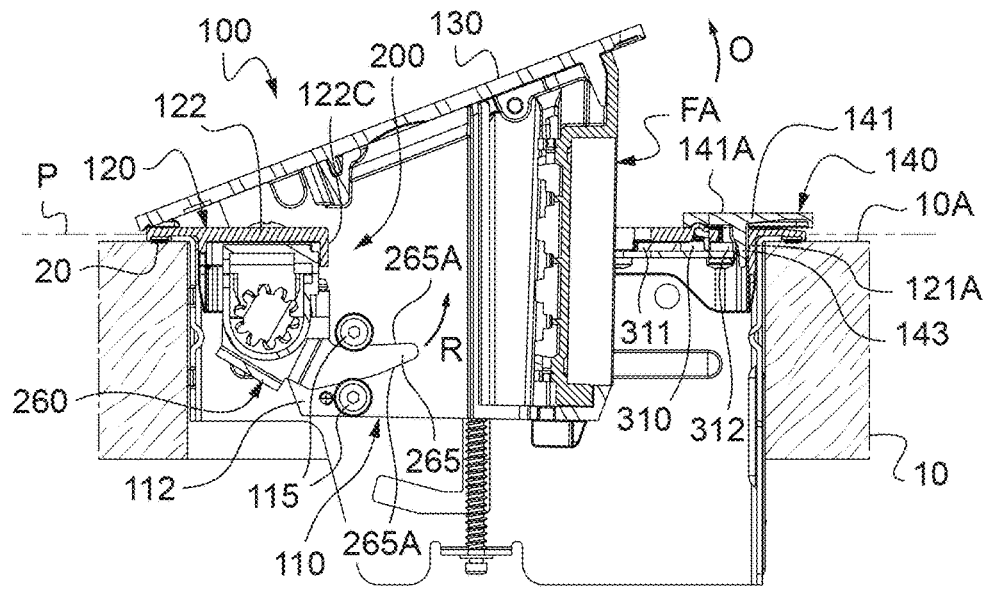
FIG. 10 is a section view of the accessory similar to the view in FIG. 7, its actuator button being shown in its standby position and the accessory support mid-way between its lowered position and its raised position.

As shown in FIGS. 8 and 9, in order to open the accessory 100; 100', the user presses with a finger on the presser wall 141 of the actuator button 140 so as to cause it to tilt towards the outside of the façade plate 120. Preferably, a mark 147 is provided in a central region of the front face 141A of the presser wall 141 of the actuator button 140 so as to indicate to the user the location where the user can press with a finger on said presser wall 141, but, advantageously, pressing at any location on the front face 141A of the presser wall 141, causes said actuator button 140 to tilt and said locking arms 310 to be actuated via the actuator rib 143. Specifically, during tilting of the actuator button, the actuator rib 143 pushes the actuator portions 312 of the locking arms 310 a little, which locking arms 310 pivot about the pivot axes Z, respectively as shown by arrows H and AH (see FIG. 6), so as to take up their release position against the urging of the springs 320. The blocking portions 311 of the two locking arms 310 are disengaged from the notches of the accessory support 110 and they no longer bear against said blocking surfaces 118 of said accessory support.

The torsion springs 230 of the pivot system 200; 200' then release their torsion energy and cause the rotary drive shaft 120 to pivot. Said rotary drive shaft 120 turns the single-piece transmission part 260; 260'.

The two tabs 265 of the transmission part 260 are starting to pivot as shown by arrow R (see FIG. 9). In so doing, they slide against the cylindrical anchors of the centering pegs 115 that are carried by the main side walls 111, 112 of the accessory support 110, pushing against the top centering pegs 115. The tabs 265 then turn the accessory support 110 which pivots as shown by arrow O (see FIGS. 9 to 14) until it reaches its raised position above the façade plate 120, and thus above the reception wall 10 (see FIGS. 13 and 14).

Figure 18:
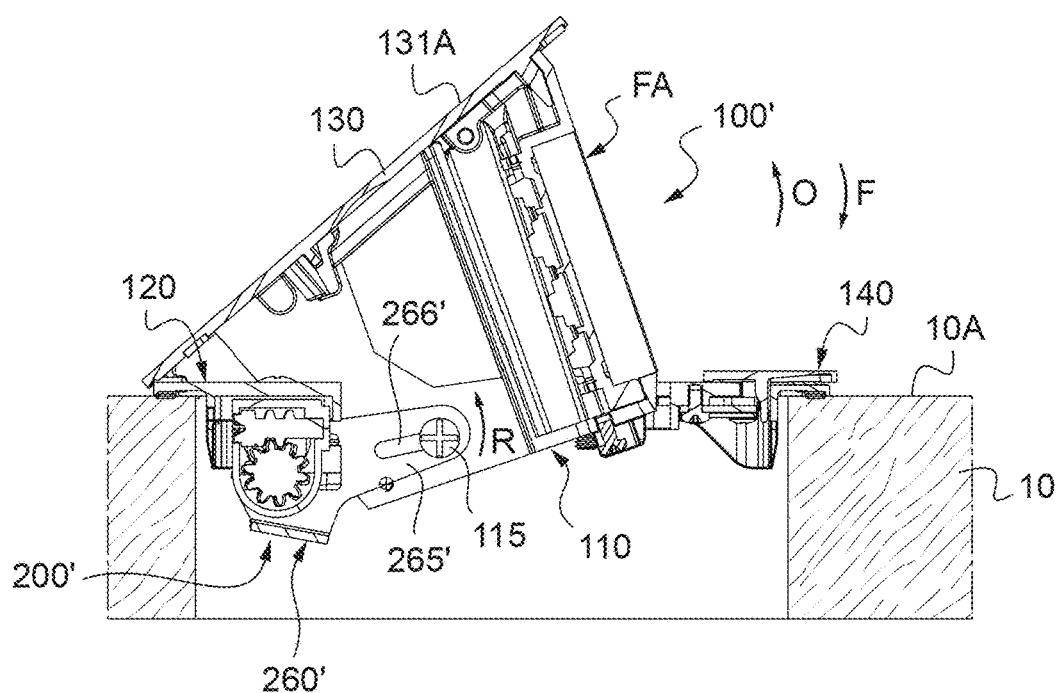
FIG. 18 is a section view similar to the view in FIG. 16 of the accessory, with the actuator button in its standby position and the accessory support in its raised position.

As shown in FIGS. 17 and 18, the two tabs 265' of the transmission part 260' are starting to pivot as shown by arrow R. In so doing, they slide against the cylindrical anchor of each centering peg 115, with their bottom inner longitudinal edges 266'A pushing against said centering pegs 115. Each tab 265' then turns the accessory support 110 which pivots as shown by arrow O (see FIGS. 17 to 18) until it reaches its raised position above the façade plate 120, and thus above the reception wall 10 (see FIGS. 17 and 18).

After pressing briefly on the actuator button 140, the user can release it. Said actuator button 140, under the urging of the springs 320, immediately returns to its stable standby position. The beads 144 bear against the inside faces of the slot 121A of the façade plate 120 so as to position the presser wall 141 of the actuator button 140 correctly in its standby position, parallel to the mean plane P of the façade plate 120. Under the urging of the springs 320, the locking arms 310 pivot towards their locking position, and, during the rise of said accessory support 110, the front edges of the main side walls 111, 112 of the accessory support 110 slide against the blocking portions of said locking arms 310, which do not prevent said accessory support 110 from rising.

The accessory support 110 reaches its stable raised position when its abutment element 114 comes into abutment against the end wall of the abutment groove 127 of the façade plate 120.

In this raised position, the functional façade FA of the accessory 100; 100' is accessible to the user, above the reception wall 10.

In order to close the accessory 100; 100', it suffices to exert pressure on the cover 130 so as to cause the accessory support 110 to tilt as shown by arrow F (see FIGS. 13, 14, and 17) towards its lowered position below the façade plate 120, and thus below the reception wall 10. This reverse tilting causes the reverse tilting of the tabs 265; 265', and thus the pivoting of the rotary drive shaft 220 that causes torsion of the torsion springs 230 of the pivot system 200. The torsion springs 230 then once again store torsion energy. The lowered position of the accessory support 110 is reached when the blocking portions 311 of the locking arms 310, urged by the springs 320, are engaged in the notches of the accessory support 110, bearing against the blocking surfaces 118.

The present invention is not limited to the embodiments described and shown in the various figures, and the person skilled in the art can apply any variation thereto in accordance with the spirit of the invention.

In a variant that is not shown, provision could be made for the actuator button to be a small piano key. As a result, the presser wall of the actuator button presents an outline that is rectangular, and lengthwise the actuator rib extends perpendicularly to the longitudinal edges of said presser wall. Lengthwise the presser wall of the actuator button is then oriented perpendicularly to the portions of the inner and outer peripheral edges of the façade plate that form the longitudinal edges of said branch of the façade plate.

Furthermore, in another variant that is not shown, it could be envisaged that said return means are resilient means that are compressed between each locking arm and a portion of the façade plate.

The invention claimed is:

1. An accessory (100) that comprises:
a façade plate (120) presenting an opening (124);
an accessory support (110) that is mounted to tilt through said opening between a lowered position in which the accessory support extends below the façade plate, and a raised position in which a major portion thereof extends above the façade plate;
a locking system (300) that comprises firstly at least one locking arm (310) that is movable between a locking position in which a blocking portion (311) of said locking arm bears against a blocking surface (118) of the accessory support (110), and a release position in which said blocking portion (311) is spaced apart from said blocking surface (118), and secondly an actuator button (140), distinct from the accessory support (110), that co-operates with said locking arm so as to cause the locking arm (310) to move, the actuator button being tiltable about a tilt axis (X1) that extends parallel to the mean plane (P) of said façade plate (120);
wherein said locking arm (310) is pivotable about a pivot axis (Z) that is perpendicular to said tilt axis (X1) of the actuator button (140), and wherein resilient return means (320) are provided that continuously urge said locking arm (310) into the locking position.

2. The accessory (100) according to claim 1, wherein the façade plate (120) comprises a frame that is defined between an outer peripheral edge (120C) and an inner peripheral edge (121C, 122C, 123C), the inner peripheral edge defining said opening (124), and wherein said actuator button (140) includes a presser wall (141) that is positioned above a branch (121) of the frame defined between a portion of said inner and outer peripheral edges, the presser wall (121) presenting a front face (141A) that forms a presser surface to be pressed by a user's finger, and said actuator button being adapted to tilt between a standby position, in which said front face (141A) of said presser wall (141) extends substantially parallel to the mean plane (P) of the façade plate (120), and an actuated position, tilted towards the outside of the façade plate, in which said presser wall (141) moves closer to the outer peripheral edge (120C) of said façade plate (120), with the front face (141A) sloping relative to the mean plane (P) of the façade plate (120).

3. The accessory (100) according to claim 2, wherein the actuator button (140) includes an actuator rib (143) of height that extends rearwards from the rear face of the presser wall (141), substantially perpendicularly to said presser wall, the actuator rib being continuously in contact with said locking arm (310).

4. The accessory (100) according to claim 3, wherein said locking arm (310) extends lengthwise between one end portion that forms said blocking portion (311), and an opposite other end portion that forms an actuator portion (312) that is continuously in contact with said actuator rib (143) of the actuator button (140), the pivot axis (Z) of said locking arm (310) being situated in the proximity of the actuator portion (312).

5. The accessory (100) according to claim 4, wherein two locking arms (310) are provided, positioned so that their actuator portions (312) are close to each other, continuously in contact with the actuator rib (143) of the actuator button (140), and so that their pivot axes (Z) intersect the mean plane (P) of the façade plate (120) at positions lying on a line that is parallel to the portions of the inner and outer peripheral edges of the façade plate that form the longitudinal edges of said branch (121) of the façade plate (120).

6. The accessory (100) according to claim 3, wherein said resilient return means (320) are compressed between each locking arm (310) and said actuator rib (143), such that they likewise act continuously on said actuator button (140) so as to return the actuator button towards the standby position.

7. The accessory according to claim 1, wherein said resilient return means are compressed between each locking arm and a portion of the façade plate.

8. The accessory (100) according to claim 3, wherein the presser wall of the actuator button (140) presents an outline that is rectangular, and lengthwise the actuator rib extends parallel to the longitudinal edges of said presser wall (141).

9. The accessory (100) according to claim 8, wherein lengthwise the presser wall (141) of the actuator button (140) is oriented parallel to the portions of the inner and outer peripheral edges (121C and 120C) of the façade plate (120) that form the longitudinal edges of said branch (121) of the façade plate.

10. The accessory (100) according to claim 9, wherein said presser wall (141) presents a large surface area and a length that is a little greater than the length of said branch (121) of the façade plate (120) so that the presser wall covers a major portion of the front face of said branch of said façade plate together with a portion of said outer peripheral edge (120C) of the façade plate (120), which portion of the outer peripheral edge (120C) forms firstly the entire outer longitudinal edge of said branch, and secondly a portion of the transverse edges of said branch (121).

11. The accessory according to claim 3, wherein the presser wall of the actuator button presents an outline that is rectangular, and lengthwise the actuator rib extends perpendicularly to the longitudinal edges of said presser wall.

12. The accessory according to claim 11, wherein lengthwise the presser wall of the actuator button is oriented perpendicularly to the portions of the inner and outer peripheral edges of the façade plate that form the longitudinal edges of said branch of the façade plate.

13. The accessory (100) according to claim 3, wherein the façade plate (120) includes a slot (121A) through which the actuator rib (143) of the actuator button (140) passes so as to reach each locking arm (310).

14. The accessory (100) according to claim 13, wherein, on one face of the actuator rib, the actuator rib (143) of the actuator button (140) carries at least one bead (144) that extends longitudinally over the height of said actuator rib, each bead being adapted to come into contact with an inner portion of the façade plate that extends along an edge of said slot (121A), so as to index the standby position of said actuator button (140).

15. The accessory (100) according to claim 4, wherein said resilient return means (320) are compressed between each locking arm (310) and said actuator rib (143), such that they likewise act continuously on said actuator button (140) so as to return the actuator button towards the standby position.

16. The accessory (100) according to claim 5, wherein said resilient return means (320) are compressed between each locking arm (310) and said actuator rib (143), such that they likewise act continuously on said actuator button (140) so as to return the actuator button towards the standby position.

17. The accessory according to claim 2, wherein said resilient return means are compressed between each locking arm and a portion of the façade plate.

18. The accessory according to claim 3, wherein said resilient return means are compressed between each locking arm and a portion of the façade plate.

19. The accessory according to claim 4, wherein said resilient return means are compressed between each locking arm and a portion of the façade plate.

20. The accessory according to claim 5, wherein said resilient return means are compressed between each locking arm and a portion of the façade plate.

* * * * *